United States Patent [19]

Kresge et al.

[11] 4,153,921

[45] May 8, 1979

[54] THERMALLY STABILIZED METAL OXIDE VARISTORS

[75] Inventors: James S. Kresge, Pittsfield, Mass.; Richard A. Menelly, Caldwell, N.J.

[73] Assignee: General Electric Company, N.Y.

[21] Appl. No.: 875,214

[22] Filed: Feb. 6, 1978

[51] Int. Cl.$^2$ ............................................. H02H 7/04
[52] U.S. Cl. ....................................... 361/40; 338/21; 361/38
[58] Field of Search ...................... 338/21; 361/37–39, 361/40, 106, 120

[56] References Cited

U.S. PATENT DOCUMENTS

| | | | |
|---|---|---|---|
| 2,399,502 | 4/1946 | Olsen ................................. | 361/39 X |
| 3,035,209 | 5/1962 | Smith, Jr. ............................. | 361/39 |
| 3,096,496 | 7/1963 | Burrage et al. ....................... | 338/21 |
| 3,227,983 | 1/1966 | Braun .................................. | 338/21 |
| 3,304,529 | 2/1967 | Forwald ............................... | 338/21 |
| 3,313,983 | 4/1967 | Mallett et al. ........................ | 361/39 |
| 3,450,945 | 6/1969 | Wurdack .............................. | 361/39 |

Primary Examiner—C. L. Albritton
Attorney, Agent, or Firm—Francis X. Doyle; Richard A. Menelly

[57] ABSTRACT

Zinc oxide varistor protective devices for vapor cooled transformers are integrally located in contact with the transformer coolant liquid to provide cooling capacity to the zinc oxide materials. The zinc oxide varistors are prevented from becoming electrically unstable by keeping the varistor operating temperature at or below the boiling point of the coolant.

5 Claims, 8 Drawing Figures

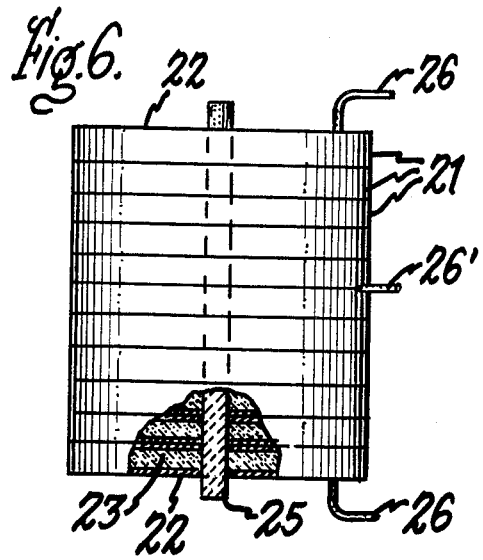
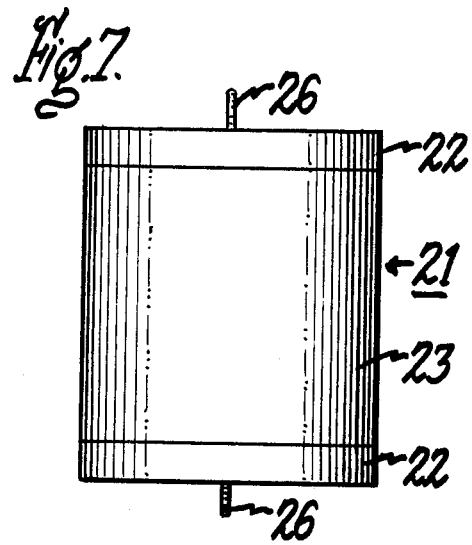
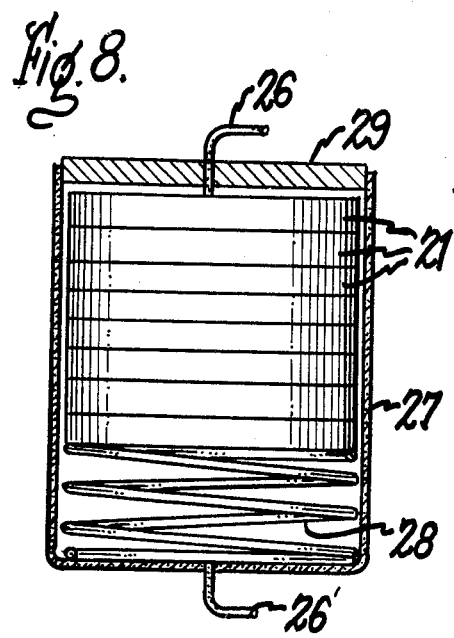
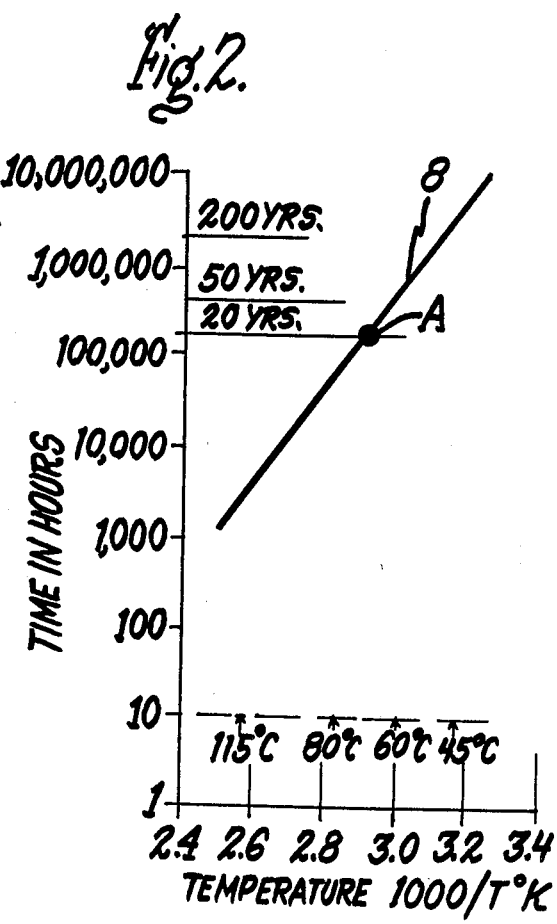

THERMALLY STABILIZED METAL OXIDE VARISTORS

BACKGROUND

Metal oxide varistors of the type consisting basically of a sintered zinc oxide composition are being used in increasing numbers as replacements for silicon carbide type voltage surge suppressors and lightning arresters. The zinc oxide varistors, to date, exhibit an instability in that the watts loss value, which is a fairly good indication of the varistor leakage current, continuously increases upon constant subjection to a D.C. or A.C. voltage. This instability phenomena is temperature sensitive, with increasing temperature causing decreased stability. In general, the rate of increase of watts loss at a particular operating voltage will double for every 6° C. increase in temperature. Methods are currently available for rendering the zinc oxide varistors sufficiently stable for continuous operation at practical operating voltages and at temperatures as high as about 70° C. but no effective method to date is available for rendering the varistors sufficiently stable under higher temperature conditions. U.S. Pat. No. 3,928,245 and U.S. Pat. application Ser. No. 836,765 teach effective methods for stabilizing varistors and are incorporated herein. Varistors being used as voltage surge protectors and lightning arresters within medium and power transformers require some means for keeping the varistors bodies at a sufficiently low temperature to ensure adequate stability at the voltage stress to which they are subjected. One method currently employed for cooling the varistor body is a mechanical heat sink which is in thermal contact with the varistor for taking the heat away from the varistor body by the process of heat conduction. Depending upon the power rating of the transformer to be protected the various heat sinks employed can be substantial in both size and cost.

The purpose of this invention is to provide methods and apparatus for keeping the zinc oxides varistors at a relatively uniform temperature independent of ambient temperature and voltage conditions for medium and power transformers of the vapor-cooled type.

SUMMARY OF THE INVENTION

The invention provides multifunctional properties for coolant fluids for transformers by mounting the varistors in thermal contact with the transformer coolant fluids.

In one embodiment of the invention the varistors are partially submersed within the transformer cooling fluid whereby the fluid provides cooling capacity to both the varistors and to the transformer windings.

For vapor cooled transformers of the type using a condensable coolant, the varistors can be mounted alternatively in contact in the reservoir or in the path of the condensed coolant in the return path from the condenser to the reservoir.

Further embodiments relate to methods for mounting a plurality of varistors on a single assembly to promote better cooling efficiency.

BRIEF DESCRIPTION OF THE DRAWINGS

FIG. 2 is a graphic representation of the relationship between varistors life and operating temperature for metal oxide varistors containing primarily zinc oxide;

FIG. 6 is a side sectional view of a mounting arrangement for the metal oxide varistors of this invention;

FIG. 7 is a side view of a zinc oxide varistor for use within the invention; and FIG. 8 is a side view of a mounting container for a plurality of zinc oxide varistors for use within the invention.

DESCRIPTION OF THE PREFERRED EMBODIMENT

Figure 1:
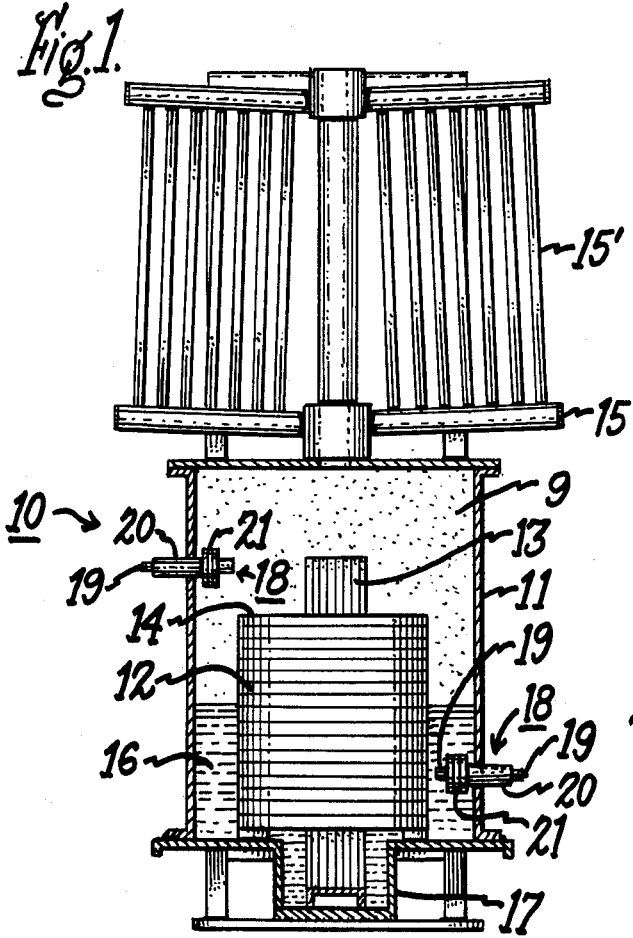
FIG. 1 is a side view in partial section of a vapor cooled transformer embodying the metal oxide varistors of this invention.

FIG. 1 shows a percolation cooling system 10 for a transformer 12 of the type consisting of a plurality of windings 14 concentrically placed around a core 13. The transformer 12 is mounted to the tank 11 by means of a supportive base 17. The percolation cooling system employs a reservoir of liquid coolant 16, a condenser 15, and a heat exchanger 15'. The percolation cooling system 10 employs the vaporization cycle of the coolant 16 in the following manner. The transformer 12, during operation, becomes heated and causes the coolant 16 to evaporate as indicated by the coolant vapor 9 which then enters into the condenser 15 where the heat of evaporation is given off within a plurality of heat exchangers 15' by condensing therein. The heat exchangers 15' generally consist of a plurality of thin metal tubes acting as a radiator. Providing that the quantity of coolant 16 is carefully prescribed for the particular transformer rating, the temperature of the coolant 16 never exceeds its boiling temperature.

For the percolation cooling system 10 of FIG. 1 the metal oxide varistor 21 can be efficiently cooled integrally within the tank 11 so that the coolant 16 multifunctionally cools the transformer windings 14 as well as the metal oxide varistor 21. One method for using the coolant 16 to cool the metal oxide varistor 21 is to mount the varistor 21 beneath the surface of the coolant 16 as indicated in the embodiment in the lower right-hand corner of tank 11 where a plurality of the metal oxide varistors (MOV) 21 are mounted at one end of the bushing 18. The bushing 18 consists of an electrical connector 19 and porcelain or ceramic-glass body 20 for preventing a short circuit between the connector 19 and the tank 11. Since the bushing 18, by means of connector 19, provides input operational voltage to the transformer 12, the varistors 21 can be electrically connected in parallel with one of the connectors 19 and the tank 11 which is electrically connected to ground. In the event of an overvoltage surge such as that caused by a lightning occurrence, the varistors 21 become readily conductive and direct the incoming electrical current to the casing 11 and from there to ground. So long as the varistor 21 is immersed in the liquid coolant 16 the varistor temperature cannot exceed the boiling point of the coolant 16 about 70° C. for a coolant such as freon for example.

It may be more convenient to mount the varistor 21 of this invention above the surface of coolant 16 within tank 11. This configuration is shown in the upper lefthand corner of tank 11 where the varistors 21 are connected to the bushing 18 which is similar to the previously described bushing 18 for the embodiment below the surface coolant 16 and contains a connector 19 along with a porecelain or glass ceramic insulation material 20. The varistor 21 mounted above the surface of the liquid coolant 16 becomes cooled by the coolant 9 returning from the condenser 15 in a liquid droplet form. When mounted in this position care must be taken to ensure that sufficient liquid coolant droplets 9 impinge upon the varistor body such that some liquid runoff occurs, thereby ensuring that the varistor body is cooled to below the boiling point of the coolant 16. The positioning of the varistors 21 above the surface of coolant 16 conveniently permits replacing the varistors 21 without having to drain the tank 11 of coolant 16.

FIG. 2 illustrates the projected life 8 in hours for MOV's of the type consisting of a sintered zinc oxide material having a plurality of other metal oxide additives to promote the required nonlinear voltage ampere characteristics for operation as voltage surge suppressors and lightning arresters at various operation temperatures. When operated under a continuous voltage stress all MOV's of the zinc oxide type exhibit a continuous increase in watts loss with increasing time. This increase in watts loss is referred to herein as "stability drift". The varistors also exhibit a strong positive temperature coefficient of watts loss. This means that at a given voltage stress an increase in the temperature of the varistor also causes the watts loss to increase. The result of both of the above effects is that if the stability drift of the varistor is severe, the watts loss can increase to such an extent that the varistor can become self heated such that failure occurs. This is termed "thermal runaway" and is the main reason that the stability drift rate must be controlled within the acceptable limits.

The stability drift rate depends upon the nature and amount of metal oxide additives in the varistor composition as well as post sintering heat treatment as disclosed in the aforementioned U.S. Patent and application. However, varistors manufactured from the most favorable varistor composition and thermally treated for stability still exhibit a definite stability drift. Measurements indicate that the logarithm of the time required for the watts loss to increase by a fixed ratio (e.g. to double the original value) is directly related to the reciprocal of the absolute temperature and is illustrated at 8 in FIG. 2. Corresponding temperature values in degrees centigrade are also included. This is a familiar characteristic of many aging phenomena and is recognized by those skilled in the art as the "Arrhenius plot".

Curve 8 of FIG. 2 represents the thermal drift rate for state of the art varistors and shows that for a reasonable life of 20 years for example, the continuous operating temperature should not exceed 70° C. as indicated at point A. The operating temperature of varistors in vapor cooled transformers can be kept within this limit by ensuring contact between the varistor and the liquid phase of the coolant when the boiling point of the coolant does not exceed the allowable continuous operating temperature of the varistor.

Figure 3:
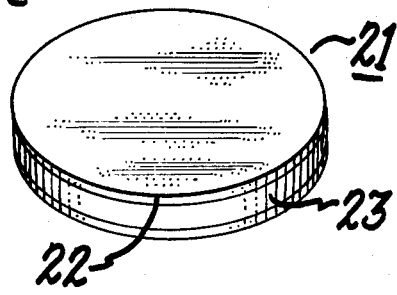
FIG. 3 is a top perspective view of a zinc oxide varistor for use within this invention.

FIG. 3 shows one embodiment of a metal oxide varistor for use within the invention. Here the MOV 21 of the type having a zinc oxide composition including the oxides of bismuth barium, silicon, boron and other metal oxides in lesser concentrations. Although the MOV's of this invention contain the above composition, it is to be clearly understood that any MOV of the type containing a large concentration of zinc oxide will also become temperature stabilized by the method of this invention. It is to be further noted that other types of semiconductive varistors such as silicon carbide can also be temperature stabilized by the method of this invention. The embodiment of FIG. 3 contains an electrode 22 on both sides of the MOV 21 and a ceramic or other insulating coating 23 along the periphery. The metallic electrodes 22 provide electrical contact to the zinc oxide material and the ceramic coating 23 prevents the transfer of current between metallic electrodes by leakage over the peripheral surface without passage through the zinc oxide composition.

Figure 4:
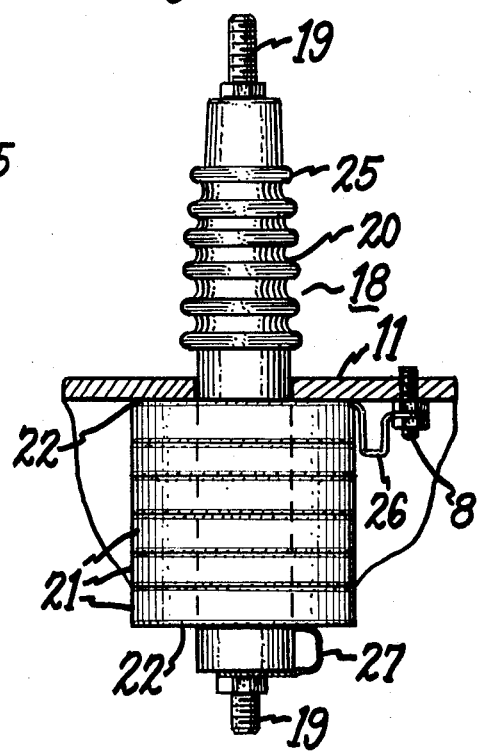
FIG. 4 is a side sectional view of a transformer bushing containing the metal oxide varistors of this invention.

FIG. 4 shows the mounting arrangements of FIG. 1 in greater detail wherein bushing 18 contains line connector 19, insulative material 20 and a plurality of extensions 25 to promote a tortuous surface area between the connector 19 and the grounded metal tank 11. The bushing 18 is mounted to the tank wall 11 and the MOV's 21 are stacked on the porcelain material 20 on the coolant side of the tank wall 11. The MOV's 21 are electrically connected to the tank 11 by means of a grounding lug 8. The grounding lug 8 is connected to the electrode 22 of the upper most varistor 21 by means of the lead 26. The electrode 22 of the lower most varistor 21 is connected to the bushing connector 19 by means of a separate lead 27.

Figure 5:
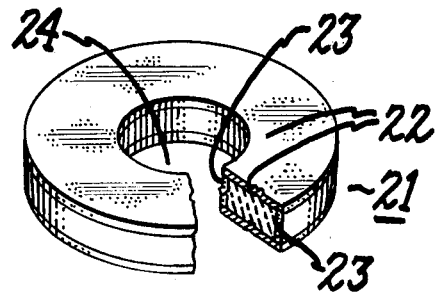
FIG. 5 is a top perspective view of an alternate embodiment of the zinc oxide varistor of FIG. 3.

FIG. 5 shows a varistor 21 for use with the embodiment of FIG. 4 and containing a hole 24 for convenience in placing over the bushing 18. The varistor 21 is similar to the varistor at FIG. 3 in having an electrode 22 on both surfaces and a ceramic coating 23 along the periphery and differs from the varistor 21 of FIG. 3 in having the mounting hole 25 and a ceramic coating 23 on the inner periphery of the hole 24. The purpose of the ceramic coating 23 on the inner periphery of the hole 24 is to prevent electrical conductivity between the electrode 22 and also between the varistor 21 and the material used for mounting with hole 24.

In a further embodiment of this invention a plurality of varistors are mounted in tandem upon a mounting post other than the transformer bushing.

FIG. 6 shows a plurality of varistors 21 concentrically arranged upon a center post 25 made of a ceramic or other insulating material similar to the porcelain and/or glass ceramic 20 for the bushings of FIGS. 1 and 4 as described earlier. In the embodiment of FIG. 6 the varistors 21 are stacked such that the uppermost electrode 22 is electrically connected to a lead 26 for connecting to one of the transformer primary leads and lead 26' is connected to ground. The number of varistors 21 determine the ultimate voltage that can be sustained between lead 26 and lead 26' before the varistors 21 become electrically conductive and bypass the incoming overvoltage surge via lead 26 to ground lead 26'. The bottom lead 26 is connected to the other incoming primary lead to the transformer such that both transformer primary leads are electrically protected from voltage oversurges by the same stack of varistors 21. The center post 25 can be mounted to the side of the tank 11 as depicted for the embodiment of FIG. 1 with the center post 25 used in place of the bushings 18.

FIG. 7 shows one type varistor 21 for use within the method of this invention. The varistor 21 of FIG. 7 differs from the varistors shown in FIG. 6 by being constructed of one continuous varistor rather than a plurality of varistors. The varistor 21 in FIG. 7 contains electrode 22 at both ends and a pair of contact leads 26.

A ceramic or other insulating layer 23 is provided on the outer surface of the varistor 21 and the length is calculated such that the breakdown voltage for the single element varistor 21 is equal to that for the plurality shown in the stack of varistors described earlier.

FIG. 8 is an alternate method for mounting a plurality of varistors 21 within a common casing 27. The casing 27 is made of high temperature material such as ceramic in order not to fail under the relatively high temperatures developed during the conditions of overvoltage surges. When the casing 27 is made of metal, care is taken to ensure that the varistors 21 do not become short circuited and are separated from the metallic casing 21 by means of the ceramic coating 23. Alternatively, the casing 27 can be made of a high temperature ceramic material of a substance similar to that as described earlier for the bushings of FIGS. 1 to 4. The casing includes a cover 29 and a tension spring 28 as well as a pair of leads 26 for making electrical contact with the varistors 21. The purpose of the tension spring 28 is to provide good mechanical contact between the individual varistors 21 to ensure electrical conductivity between the pair of electrodes 26 in the event of an overvoltage condition.

Although the voltage stabilization properties imparted to the metal oxide varistors of this invention are shown for application within medium and power transformers, this is by way of example only. The method and apparatus of this invention find application wherever metal oxide varistors are used as voltage surge protectors and lightning arresters under conditions of ambient temperature variations.

What I claim as new and desire to secure by Letters Patent of the United States is:

1. A method for thermally stabilizing metal oxide varistors of the type used as voltage surge protectors in lightning arresters for vaporizable fluid-cooled electrical apparatus having a heat exchanger comprising the steps of:
   mounting the metal oxide varistors above the vaporizable coolant for contact with condensed fluid returning from the heat exchanger;
   connecting one electrode of the metal oxide varistors with an input lead to the electrical apparatus; and
   connecting the other electrode of the metal oxide varistor to ground.

2. The method of claim 1 including the steps of providing a plurality of the metal oxide varistors in a stack configuration whereby the electrode of one varistor in the stack becomes electrically connected with the following varistor in the stack to form an electrical series arrangement.

3. The method of claim 1 including the step of at least partially submerging the metal oxide varistor in the fluid.

4. The method of claim 1 wherein the fluid comprises a condensable coolant.

5. The method of claim 1 including the step of mounting the metal oxide varistor on at least one electrical feed through bushing.

* * * * *